(12) United States Patent
Syrjärinne

(10) Patent No.: US 6,774,842 B2
(45) Date of Patent: Aug. 10, 2004

(54) GENERATING ENTRIES FOR A DATABASE SUPPORTING A POSITIONING OF A MOBILE TERMINAL

(75) Inventor: Paula Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/309,746

(22) Filed: Dec. 3, 2002

(65) Prior Publication Data

US 2004/0104841 A1 Jun. 3, 2004

(51) Int. Cl.⁷ .............................................. H04B 7/185
(52) U.S. Cl. .................................................. 342/357.13
(58) Field of Search .......................... 342/357.01, 357.1, 342/357.13; 701/213, 215; 455/422.1, 456.1, 457

(56) References Cited

U.S. PATENT DOCUMENTS 6,246,882 B1 * 6/2001 Lachance .................... 455/456
6,307,504 B1 * 10/2001 Sheynblat ............... 342/357.06
2003/0157942 A1 * 8/2003 Osmo ......................... 455/456

FOREIGN PATENT DOCUMENTS

EP          1237009          9/2002

* cited by examiner

*Primary Examiner*—Dao Phan
(74) *Attorney, Agent, or Firm*—Ware, Fressola, Van Der Sluys & Adolphson LLP

(57) ABSTRACT

The invention relates to a method for generating entries for a database, which database is destined for supporting a positioning of a mobile terminal. In order to enable the generation of information for this database, the method calculating at least one position of a mobile terminal in a cell of a cellular network. The method further comprises determining geographical information on this cell based on the at least one calculated position of the mobile terminal in this cell. Finally, the method comprises providing the determined geographical information together with an identification of the cell for storage in the database. The invention relates equally to a unit and to a system in which such a method is implemented.

74 Claims, 11 Drawing Sheets

GENERATING ENTRIES FOR A DATABASE SUPPORTING A POSITIONING OF A MOBILE TERMINAL

FIELD OF THE INVENTION

The invention relates to a method for generating entries for a database, which database is destined for supporting a positioning of a mobile terminal, in particular a hybrid positioning of a mobile terminal. The invention relates equally to a unit realizing such a method and to a system realizing such a method.

BACKGROUND OF THE INVENTION

In a hybrid positioning of a mobile terminal, data from a main positioning system, e.g. a satellite based positioning system, are combined with data from a cellular network in order to determine the position of the mobile terminal.

A well known satellite based positioning system is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information comprises in particular ephemeris data. Ephemeris parameters describe short sections of the orbit of the respective satellite. Based on these ephemeris parameters, an algorithm can estimate the position and the velocity of the satellite for any time of about 2–4 hours during which the satellite is in the respective described section. Ephemeris data also comprise clock correction parameters which indicate the current deviation of the satellite clock versus a general GPS time.

Further, a time-of-week TOW count is reported every six seconds as another part of the navigation message.

A GPS receiver of which the position is to be determined receives the signals transmitted by the currently available satellites, and a tracking unit of the receiver detects and tracks the channels used by different satellites based on the different comprised C/A codes. The receiver first determines the time of transmission of the ranging code transmitted by each satellite. Usually, the estimated time of transmission is composed of two components. A first component is the TOW count extracted from the decoded navigation message in the signals from the satellite, which has a precision of six seconds. A second component is based on counting the epochs and chips from the time at which the bits indicating the TOW are received in the tracking unit of the receiver. The epoch and chip count provides the receiver with the milliseconds and sub-milliseconds of the time of transmission of specific received bits. A detected epoch edge also indicates the code phase of a received signal.

Based on the time of transmission and the measured time of arrival TOA of the ranging code at the receiver, the time of flight TOF required by the ranging code to propagate from the satellite to the receiver is determined. By multiplying this TOF with the speed of light, it is converted to the distance between the receiver and the respective satellite. The computed distance between a specific satellite and a receiver is called pseudo-range, because the general GPS time is not accurately known in the receiver. The computed distances and the estimated positions of the satellites then permit a calculation of the current position of the receiver, since the receiver is located at an intersection of the pseudo-ranges from a set of satellites.

In weak signal conditions, however, GPS positioning cannot be carried out in a standalone fashion in the receiver. Assistance of some kind is needed to recover the positioning capability. If the GPS receiver is part of or connected to a mobile terminal operating in a cellular communication network, the simplest form of GPS assistance is to deliver navigation data over the cellular network to the receiver. Usually, missing navigation data is the key element why positioning cannot be maintained or initiated in weak signal condition for a long period.

A more sophisticated form of assisting the receiver is a delivery of the exact GPS time to the receiver. Exact time is needed e.g. to improve the sensitivity of the receiver. However, along the exact time also a reference location of some quality is basically mandatory. The reference location, i.e. a known position near to the expected location of the receiver, is needed for calculating geometrical distances between the satellites and the receiver. The calculated distances are then used for predicting navigation data bit edges and C/A-code phases, in order to improve the sensitivity of the receiver and to speed up the signal acquisition.

The availability of a reference location is thus a key factor for some time recovery and sensitivity improvement methods in assisted GPS. If the GPS receiver is part of or connected to a mobile terminal operating in a cellular communication network, the coordinates of the cell in which the mobile terminal is known to be located could be used as reference location. However, while a cellular communication network usually provides a mobile terminal with an identification of the cell in which it is currently located, this identification does not contain information about the geographical location of the cell. The geographical location information of the cells in a cellular network is usually controlled by the network operators. Thus, in order to obtain a reference location from the network, it is necessary to poll the location from the network, which might be time consuming. Especially in the case of emergency calls a delay in signal acquisition may be critical. Moreover, the network operators offer the position information usually as a chargeable service to their subscribers, unless it is required for an emergency call.

If an available reference location is too far from the receiver, it decreases the possibilities to assist GPS hardware in acquisition and in tracking and prohibits the use of some time recovery methods in the case that the time assistance is not exact. Thus, it is also useful to know the reliability of a provided reference position, i.e. the maximum distance from the current position of the receiver to the provided reference location. If the accuracy of the reference location is known to be good enough for some application, the reference position can even be used as such, and GPS is not required at all.

In conventional positioning systems, the accuracy of the reference location is either provided by a cellular communication network or not available at all.

Similar problems may also arise with other positioning systems than GPS.

In order to avoid the necessity of polling the cellular network each time a reference location is required, European patent application EP 1 237 009 A2 introduced the idea of a cell location database. The proposed database is used to store the geographical position of cells. In the Global System for Mobile Communication (GSM), each cell has a unique Cell Global Identity (CGI) identification. When a CGI has once been associated with a geographical position, this position can be stored and used as reference location also later on, whenever the receiver is in the coverage area of the cell with this particular CGI. The database can be stored in the non-volatile memory of a mobile terminal or be downloaded from a network independently from the operator of the cellular network, e.g. using the Wireless Application Protocol (WAP). The cited patent application, which is incorporated by reference herein, also provides a detailed description on how the geographical information in the database can be used as reference location in the positioning of a mobile terminal. It does not specify, however, how the geographical information can be estimated.

SUMMARY OF THE INVENTION

It is an object of the invention to enable the generation of information on cells of a cellular network for a database which is to be used for a positioning of a mobile terminal.

A method is proposed which comprises as a first step calculating at least one position of a mobile terminal in a cell of a cellular network. This at least one position can be calculated for instance based on satellite signals using a satellite positioning system. It can be calculated equally, however, using some other positioning method like a network-based positioning method, e.g. E-OTD (enhanced observed time difference), or such positioning solutions as WLAN (wireless local area network) positioning or Bluetooth™ positioning. In a second step, geographical information on the cell is determined based on the at least one calculated position of the mobile terminal in the cell. The geographical information can comprise for instance coordinates, i.e. latitude and longitude values, which belong to a location within the cell. Finally, the determined geographical information is provided together with an identification of the cell, e.g. a CGI, for storage in the database.

The mobile terminal can be any device which is suited to exchange signals with a cellular network. The proposed method or parts of the proposed method can be implemented in the mobile terminal which comprises processing means to this end, or in another unit external to the mobile terminal which comprises processing means to this end. The method can be implemented for example in a network unit which receives the required information for the processing from the mobile terminal. Further, the mobile terminal may comprise a receiver for receiving satellite signals, which can be used for determining the at least one position of the mobile terminal, e.g. a GPS receiver, or it may be connectable to such a receiver.

Further, a system is proposed which comprises a mobile terminal with communication means for communicating with a cellular network, a database destined for supporting a positioning of said mobile terminal, and processing means for realizing the proposed method. These processing means can be distributed in any suitable way to the receiver, the mobile terminal and, if desired, to an additional network unit.

A cellular network usually provides a mobile terminal attached to the network with an identification of each cell of the network which is entered by the mobile terminal. The invention proceeds from the idea that an available information on the identity of a cell of a cellular network in which a mobile terminal is currently located can be combined with position information for this mobile terminal which is obtained by some positioning method. Since the mobile terminal is known to be located in a specific cell when a positioning is performed, the data of a recorded position can be used for geographical information on the cell for future visits of the cell, when it is stored in a database. In case several positions are available for one cell, a plurality of positions can be evaluated to determine the geographical information, in order to obtain a reference location which is as close as possible to the center of the cell. The location of the center of the cell is the preferred reference location, since the maximum distance of a mobile terminal located in the cell to some reference location in the cell is minimal, when the reference location correspond to the center of the cell.

It is to be noted that a mobile terminal will often be located within several cells at the same time, since it will usually be able to receive signals not only from the serving cell but equally from some of the neighboring cells, which could also function as serving cell. In such a case, the mobile terminal is able to receive an identification of all of these cells, e.g. the CGIs of all of these cells. Therefore, the mobile terminal may create database information for all of these cells according to the invention, not only for the current serving cell.

A mobile terminal which has access to the database for which the geographical information is provided is able to perform an assisted positioning under weak signaling conditions without having to poll the cellular network for reference location. The information stored in the database can also be used by itself for a rough positioning when the resolution of the cell locations is good enough for a desired purpose.

It is an advantage of the invention that it allows to generate the cell position information without requiring any assistance data from the cellular network. As a result, a positioning of a mobile terminal which is based on the available cell identity is not dependent on position information from cellular networks and their operators, and costs related to the delivery of reference locations by the operators can be avoided completely. Further, the time to first fix in a hybrid positioning might be reduced.

The determination of the geographical information can be based on a single calculated position, on two calculated positions or on a plurality of calculated positions. In case a plurality of positions are to be determined at different points of time, these positions can be determined for example in regular intervals.

Additionally to the geographical information, a cell range can be estimated and provided for storage in the database. The cell range can consist in particular in the radius of the cell. Such a cell range can, but does not have to be estimated equally based on calculated positions, e.g. the same positions which are used for determining the geographical information.

In an advantageous embodiment of the invention, the determined geographical information and the estimated cell range can be updated. Usually, the serving cell and those neighboring cells which are "heard" by the mobile terminal change quite frequently, especially when there are many cells and there is a lot of communication traffic in the area. In such a situation, the position information for a specific cell is gathered during a very short period of time and in a very limited area, even if in reality the cell is rather large.

The mobile terminal may leave the cell and enter it again later on, and each time at least one position is calculated for the cell. If all these pieces of position information are combined to provide the estimate of the geographical information and of the cell range, the result will be much closer to the real geographical information and the real cell range than if the estimates are based only on one gathering handled separately. This aspect of the invention is of particular advantage for large cells, but useful for cells of all sizes.

In one approach, the positions calculated during each serving period of a cell may be stored and be used together with positions calculated during later serving periods of the same cell for determining the geographical information and/or the cell range anew. In another, preferred approach, only the geographical information and the cell range determined for a specific serving period are stored. The positions calculated during later serving periods of the same cell are then combined with the stored geographical information and the stored cell range. The latter option has the advantage that it does not consume any extra memory for storing the calculated positions.

For the storage of the provided information in a database, the database may comprise different kinds of data structures.

Preferably, the data structure is hierarchical or comprises a hash table. Both approaches support a fast search for the information on a particular cell.

The database can be stored for example in a memory of the mobile terminal, which enables a particular fast access to the stored data. Alternatively or additionally, it could also be stored in a unit external to the mobile terminal. This external unit can be for example a network server, like an Internet server, in which the determined geographical location and possibly a cell range is generated, or to which this information is reported. A network server has the advantage that the available memory for storing the information can be larger. A network server could also maintain a global database for collecting geographical information provided by different mobile terminals. From this database, subsets can then be delivered upon request to various mobile terminals.

The method according to the invention can be implemented in particular by software.

Other objects, features and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
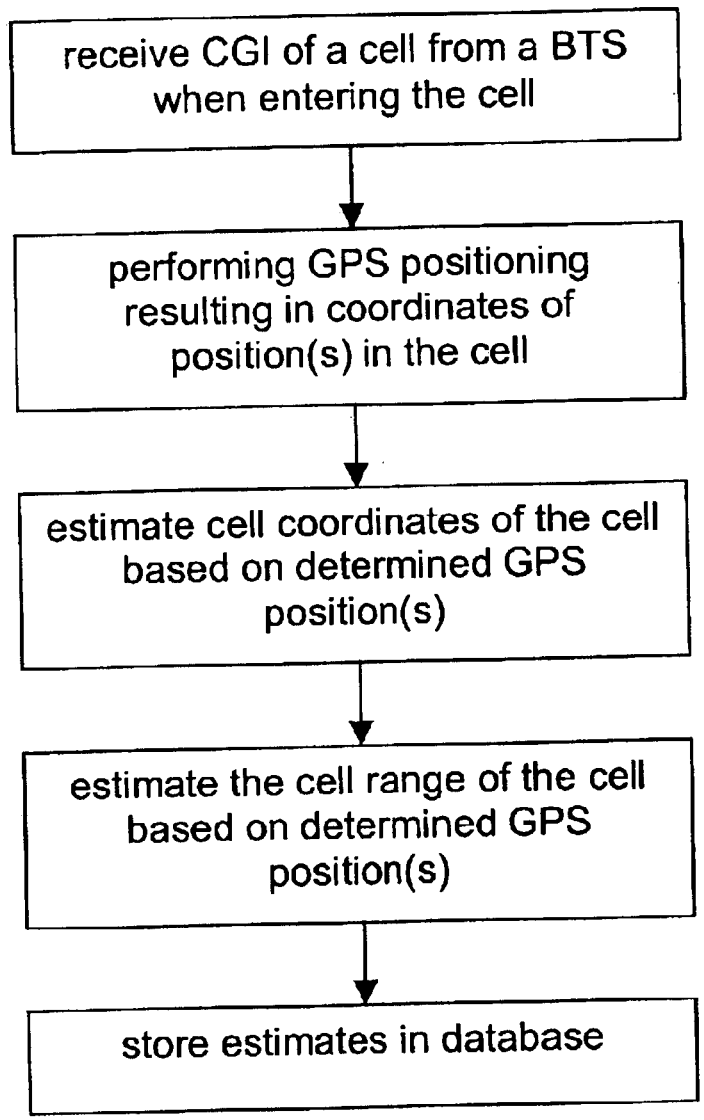
FIG. 1 is a flow chart illustrating in general embodiments of the method according to the invention.

In the following, various embodiments of the method according to the invention will be described. Each embodiment is implemented as software in a mobile terminal and is suited for creating and maintaining a database for positioning purposes.

The mobile terminal comprises means for communicating with a cellular GSM network via base transceiver stations (BTS) of this network. Each cell served by one of the BTS of the cellular network is identified by a unique code. In GSM, this unique code is called CGI, as mentioned above, and consists of four parts:

$$CGI=MCC+MNC+LAC+CI,$$

where MCC is a Mobile Country Code, MNC a Mobile Network Code, LAC a Location Area Code and CI a Cell Identity. The entire CGI has the form of a sequence of numbers.

The mobile terminal further comprises a non-volatile memory with a database. The database is used for storing coordinates of cells and the ranges of these cells, if available, associated to the CGI of the respective cell.

Moreover, the mobile station comprises a GPS receiver including an antenna for receiving signals from GPS satellites and processing means for determining the current position of the mobile terminal based on received satellite signals.

In good signaling conditions, the GPS receiver of the mobile terminal is able to determine the exact position of the mobile terminal based exclusively on received satellite signals, i.e. without any assistance data. The processing required for such a determination of the position is known from the state of the art.

In weak signaling conditions, the GPS receiver of the mobile terminal is able to determine the exact position of the mobile terminal based on the one hand on received satellite signals and on the other hand on assistance data. The assistance data comprises an exact GPS time and a reference location. The processing required for such an assisted determination of the position is known from the state of the art. The exact GPS time is provided to the mobile terminal by the cellular network. The reference location, in contrast, is extracted from the database in the non-volatile memory of the mobile terminal. That is, the coordinates stored for the cell in which the mobile terminal is currently located is used as reference location. In case an estimate of the range of this cell is stored as well in the database, this range can be used for determining the reliability of the reference location.

The database is created in the non-volatile memory of the mobile terminal when the terminal moves around in the area of a cellular network and the GPS receiver of the mobile terminal is switched on. The method implemented to this end in the mobile terminal on principle is illustrated by the flow chart of FIG. 1.

The mobile terminal receives a notification from the cellular network each time it enters a new cell, the notification comprising the CGI of the cell. When the mobile terminal is known to be located in a specific cell, it determines its own position based on GPS, either once or several times. One or more recorded positions are then used to compute cell coordinates and possibly a cell range estimate. The cell coordinates are computed as a set of latitude and longitude values. Preferably, they belong to a position close to the center of the cell. The cell range is a rough estimate on how far from the determined cell coordinates the mobile terminal may be when it is known to be located in the cell. The estimates are then stored by the mobile terminal in its database together with the currently valid CGI.

FIGS. 2 to 7 illustrate five specific embodiments of the method of FIG. 1. Each of the figures shows a BTS 1 and the boundaries of a cell 2 served by the BTS 1. Further, the route 3 of the mobile terminal through the cell is depicted.

Figure 2:
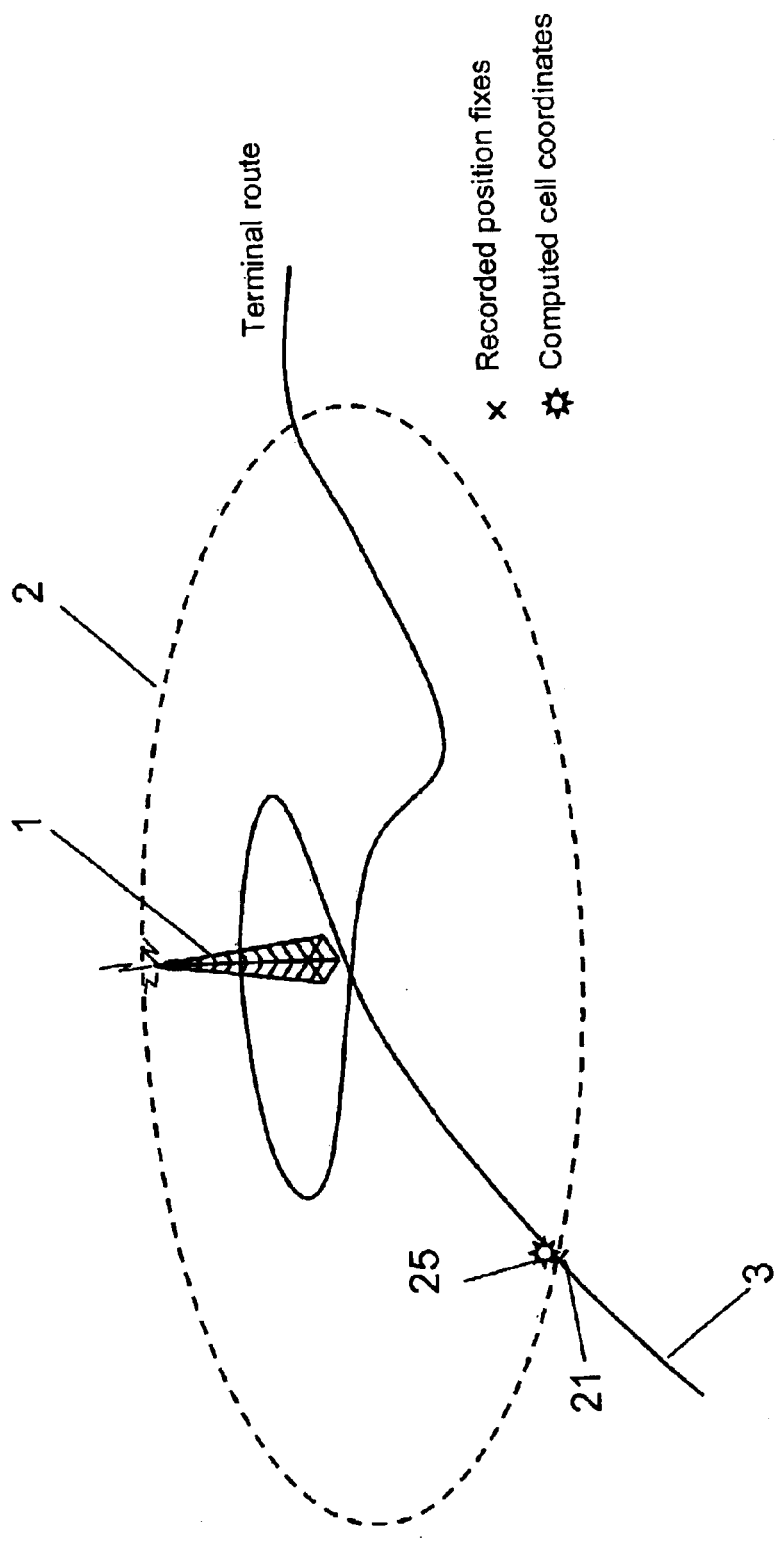
FIG. 2 illustrates a first embodiment of the method according to the invention.

In the first embodiment illustrated in FIG. 2, the GPS receiver of the mobile terminal always determines the current position of the mobile terminal when the terminal is notified of a new cell CGI, i.e. after the terminal has entered a new cell. In FIG. 2, the recorded position is indicated with a small cross 21 close to the border of the cell 2 where the terminal entered the cell 2. The coordinates of this first recorded position are determined to be the cell coordinates. The location identified by the cell coordinates, which corresponds to the recorded position, is indicated in FIG. 1 with a star 25.

The method is easy to implement and requires only one GPS position fix per cell.

Figure 3:
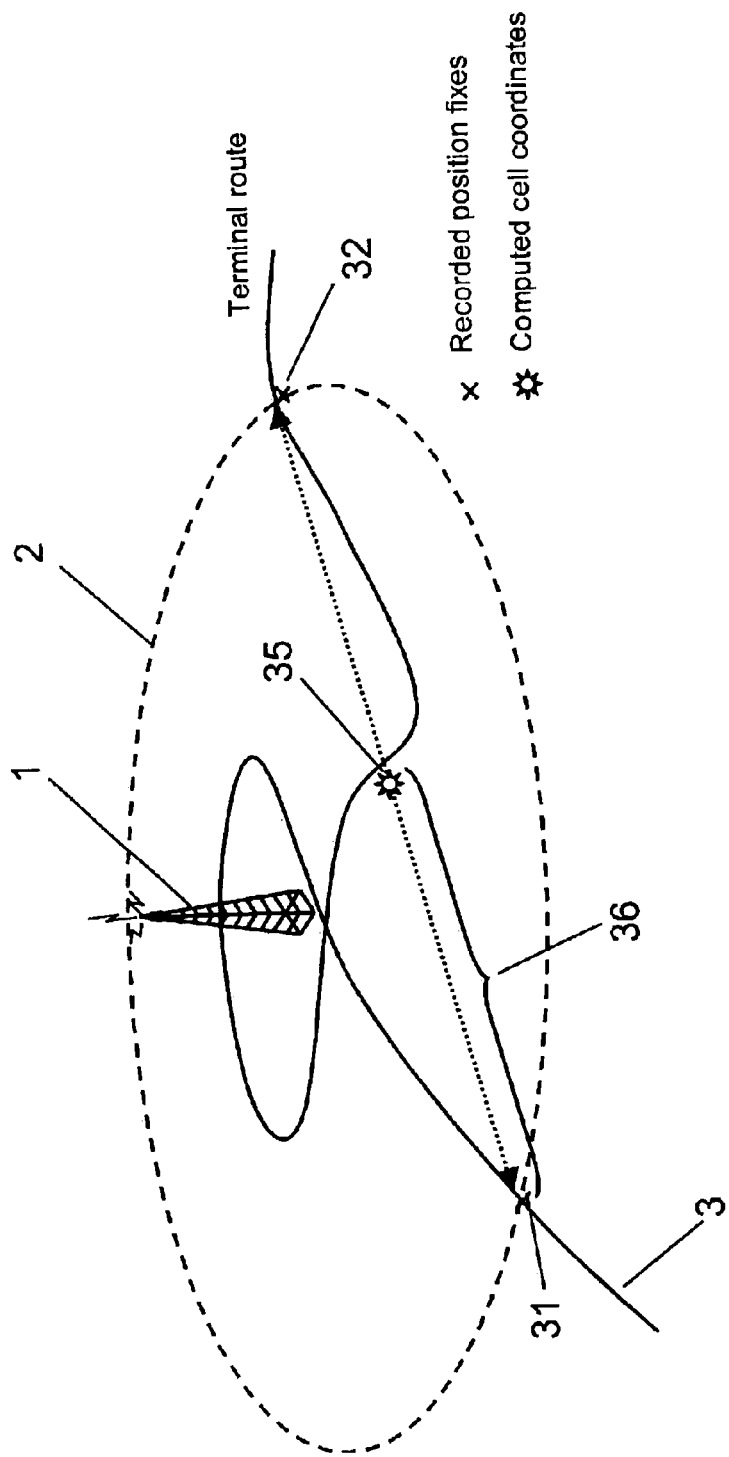
FIG. 3 illustrates a second embodiment of the method according to the invention.

In the second embodiment illustrated in FIG. 3, the GPS position of the mobile terminal is equally recorded when it enters a cell. In addition, the GPS position of the mobile terminal is recorded at the moment when it exits the cell 2. As time of exit, the time is selected when the terminal receives a notification of a new CGI since it enters the next cell. In FIG. 3, the first recorded position is indicated with a first small cross 31 and the second recorded position with a second small cross 32. The cell coordinates are then computed as the mean of the coordinates of the first position and the coordinates of the second position. The location identified by the resulting cell coordinates is indicated in FIG. 3 with a star 35.

The second embodiment of the invention is equally easy to implement. It further has the advantage over the first embodiment that the resulting position 35 is not as likely to be located at the border of the cell 2.

Moreover, the cell range can be estimated based on the two recorded positions 31, 32. The cell range can be estimated more specifically as half of the distance between the entering and the exiting position 31, 32. The resulting cell range corresponds in the maximum to the radius of the cell. The resulting estimated cell range 36 is indicated in FIG. 3 with a bracket. Calculating in addition the cell range based on the first and second fixed positions 31, 32 is also easy to implement, cheap to compute and does not require extra memory.

Figure 4:
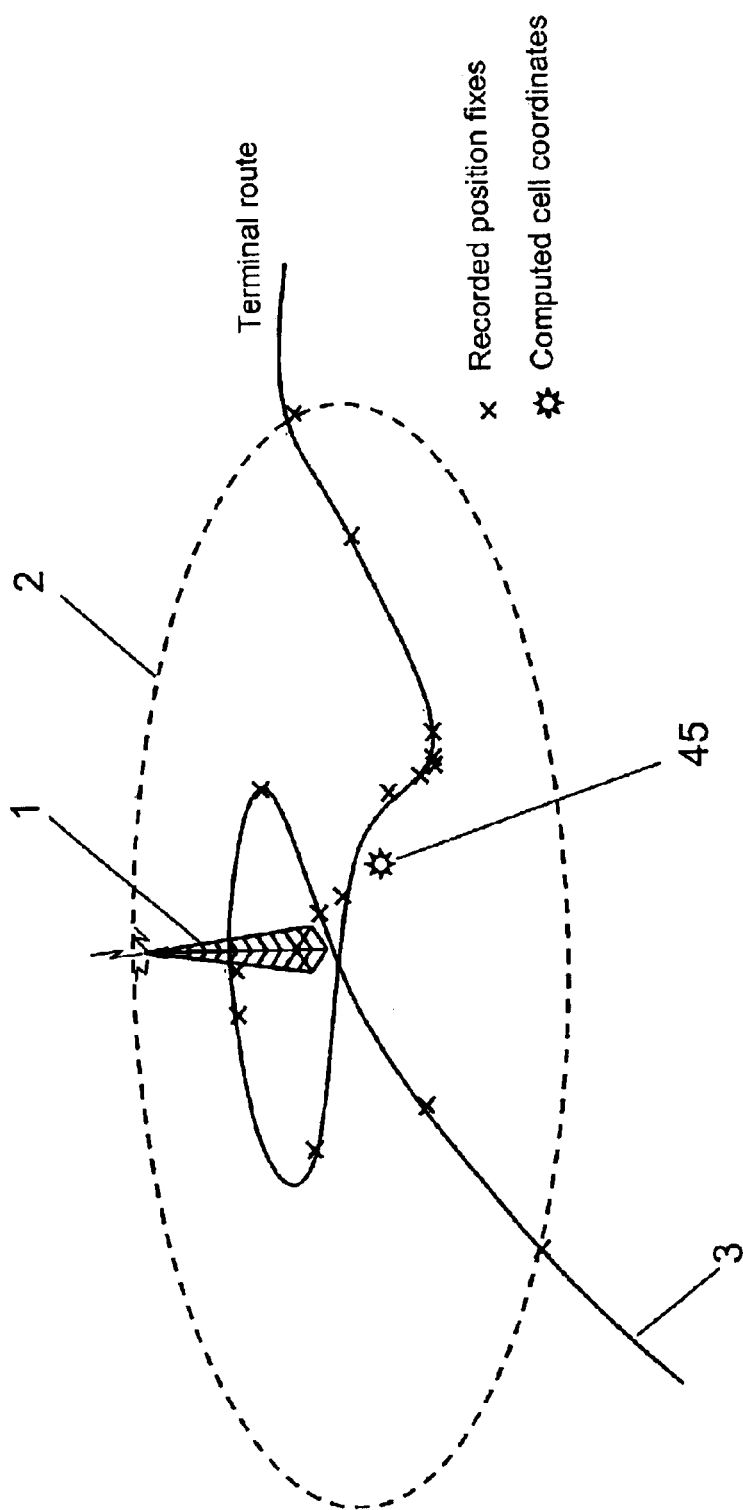
FIG. 4 illustrates a third embodiment of the method according to the invention.

For the third embodiment illustrated in FIG. 4, the GPS positions of the mobile terminal are recorded in regular intervals, e.g. once a minute. Thus, a plurality of recorded positions are obtained while the mobile terminal is staying in the cell 2. A maximum value is set for the number of GPS positions that are to be recorded. Various recorded position are indicated in FIG. 4 with small crosses.

Then, the mean, the geometrical center or some other statistical value of the coordinates of the recorded positions is computed. The resulting coordinates are employed as cell coordinates. In the example of FIG. 4, the mean of the coordinates of the recorded positions is used as cell coordinates. The location identified by the cell coordinates is indicated in FIG. 4 with a star 45.

It is an advantage of this embodiment over the first and the second embodiment that the resulting cell coordinates will rather likely lie close to the center of the cell 2.

In addition to the cell coordinates, also the cell range can be calculated in some suitable way based on the plurality of recorded positions.

Figure 5:
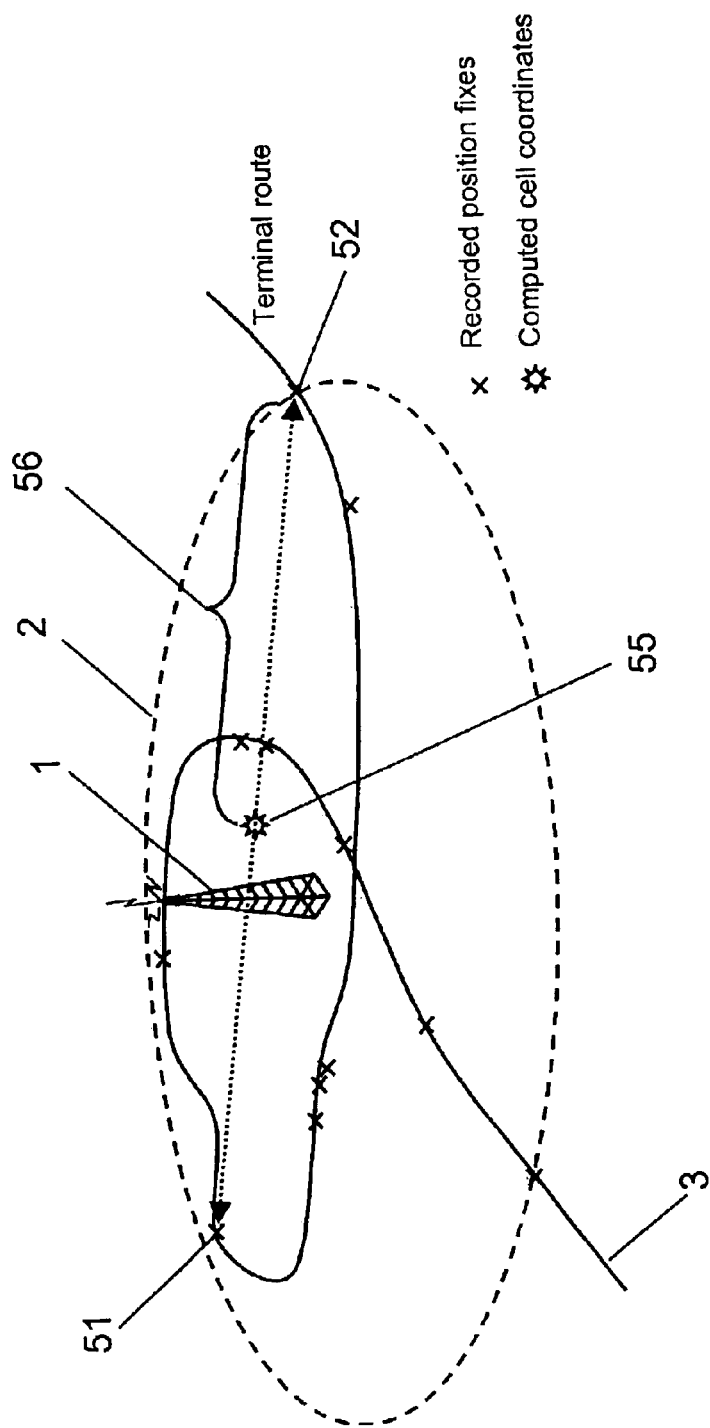
FIG. 5 illustrates a fourth embodiment of the method according to the invention.

For the fourth embodiment illustrated in FIG. 5, the GPS positions are recorded as well in regular intervals. Various recorded positions are indicated in FIG. 5 with small crosses. In this embodiment, however, next the two recorded positions which are most distant from each other are determined. These are likely to be located at opposite borders of the cell 2. In the example of FIG. 5, the two most distant fixed positions are determined to be those indicated with cross 51 and cross 52.

Thereafter, the mean of the coordinates of the two most distant fixed positions 51, 52 is determined and used as cell coordinates. The location identified by the resulting cell coordinates is indicated in FIG. 5 with a star 55.

The cell coordinates obtained with this embodiment of the method according to the invention will usually identify a location which is quite close to the center of the cell 2. When selecting a specific embodiment for implementation, however, it has to be taken into account that the search for the longest distance between two positions requires a lot of computations, and the processing load grows fast as the number of fixed positions grows.

Also the cell range can be estimated based on two recorded positions 51, 52 out of a plurality of recorded positions which are most distant to each other. Preferably, half of the distance between these two positions 51, 52 is used as estimate for the cell range. The resulting cell range corresponds in this case in the maximum to the radius of the cell. For the example of FIG. 5, the resulting estimate for the cell range 56 is indicated with a bracket. This method of estimating the cell range is clearly to be favored in case the cell coordinates are determined based on the two most distant fixed positions.

Figure 6:
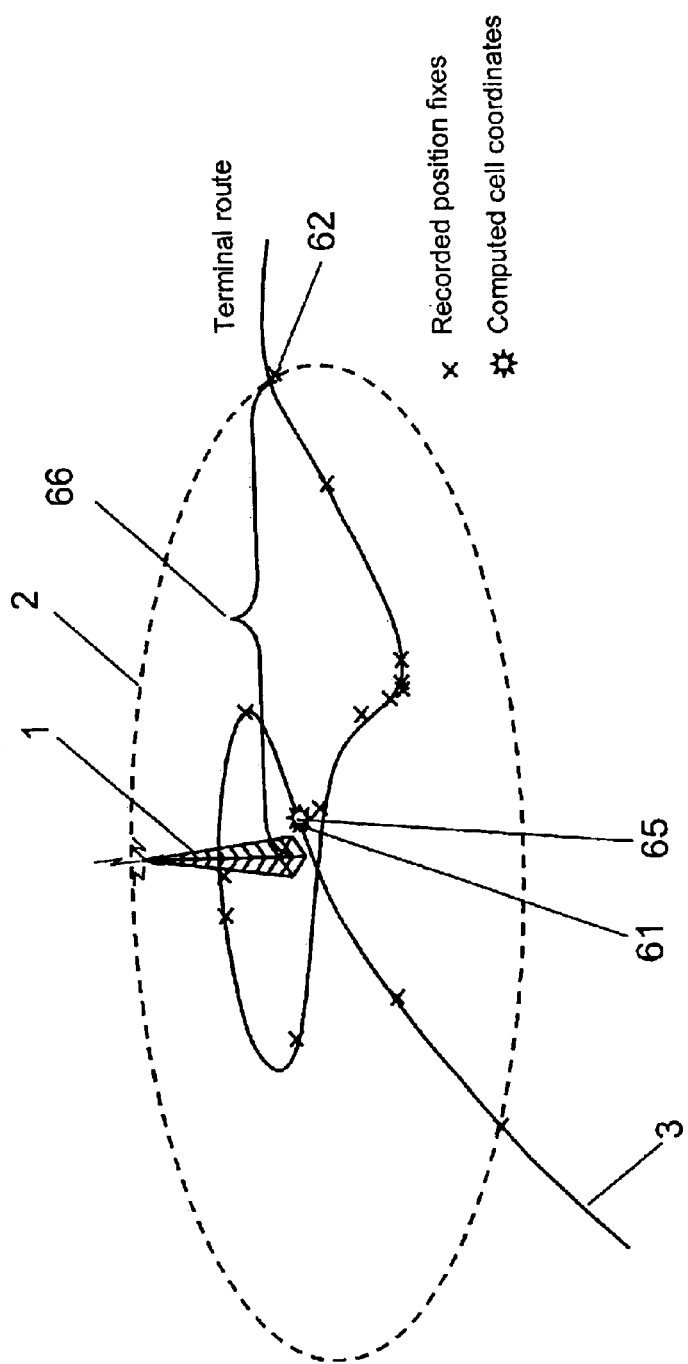
FIG. 6 illustrates a fifth embodiment of the method according to the invention in an omni-directional cell.
Figure 7:
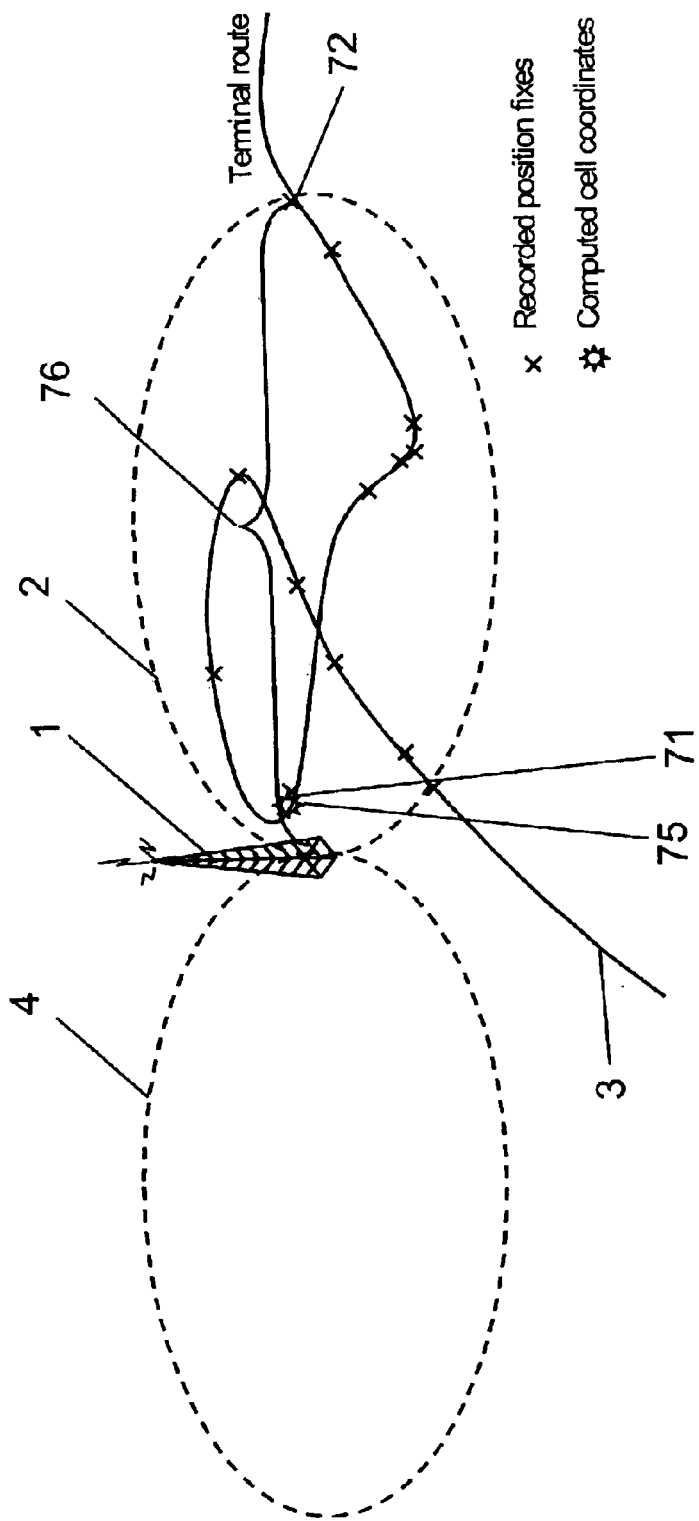
FIG. 7 illustrates the fifth embodiment of the method according to the invention in a sectorized cell.

The fifth embodiment is illustrated in FIGS. 6 and 7. While in the preceding embodiments, the results of the processing are the same for omni-directional cells and sectorized cells, a differentiation has to be made for the fifth embodiment. Therefore, FIG. 6 shows the boundaries of a single, omni-directional cell 2 with the BTS 1 in the center of the cell 2, and FIG. 7 shows the boundaries of a first sectorized cell 2, in which the mobile terminal is currently located, and the boundaries of a second sectorized cell 4. Both sectorized cells 2, 4 are served by the same BTS 1, which is located at the border between the two sectorized cells 2, 4.

In the fifth embodiment, the GPS positions are recorded as well in regular intervals. Various recorded positions are indicated in FIGS. 6 and 7 with small crosses.

For each recorded position, in addition a quantity called "timing advance" (TA) is determined.

In a GSM network, a BTS serving a specific cell sends to each mobile terminal for which this cell currently constitutes the serving cell a TA parameter according to a perceived round trip propagation delay of a signal transmitted from the BTS to the mobile terminal and back to the BTS. The mobile terminal is thereby able to advance its timing by this amount, with the result that signals from different mobile terminals arriving at the BTS are compensated for propagation delay.

The value of the TA parameter constitutes thus a measure of the approximate distance of the mobile terminal to the BTS 1. Therefore, the recorded position which is associated to the minimum TA value can be assumed to be closest to the BTS 1. The recorded position associated to the minimum TA value is indicated in FIG. 6 with a cross 61 and in FIG. 7 with a cross 71. The coordinates of this recorded position can be used as cell coordinates. The location identified by such cell coordinates is indicated in FIGS. 6 and 7, respectively, with a star 65, 75.

In the omni-directional cell 2 of FIG. 6, the position with the minimum TA value is closest to the center of the cell 2, since the BTS 1 is located in the center of the cell. However, this is not the case in the sectorized cell 2 of FIG. 7. Thus, in the case of sectorized cells, the cell coordinates are preferably determined somewhat differently, e.g. based on the mean of the coordinates of the recorded positions which are associated to the minimum and the maximum TA value.

It is an advantage of this method that it is rather easy to implement. Further, it provides cell coordinates which identify a location which is quite close to the center of the cell 2 in the case of omni-directional cells.

The value of the TA parameters received at the mobile terminal can moreover be used for estimating the cell range. The position at which the largest TA value was determined can be assumed to be farthest away from the BTS.

In omni-directional cells, the cell radius can thus be estimated to correspond to the distance of the mobile terminal to the BTS indicated by this largest TA value. The position corresponding to the largest TA value is indicated in FIG. 6 with a cross 62, while the distance of this position to the BTS 1 is indicated with a bracket 66. In sectorized cells, the distance of the mobile terminal to the BTS indicated by the largest TA value represents rather the cell diameter than the radius. The position corresponding to the largest TA value is indicated in FIG. 7 with a cross 72, while the distance of this position to the BTS 1 is indicated with a bracket 76. For determining the cell range based on the value of received TA parameters, the corresponding positions of the mobile terminal do not even have to be determined.

It is understood that the determination of the cell coordinates and the estimation of the cell range can be based on different ones of the presented embodiments of the method according to the invention.

While the first to fourth embodiments can be used in any cellular network, the fifth embodiment is suited in particular for GSM networks.

Since the cell coordinates and the cell ranges obtained by the presented embodiments are not always optimal, the entries in the database should be changeable, in order to allow a fine-tuning of the database during later visits of the mobile terminal in a respective cell. The cell coordinates obtained during a first visit may be located at one edge of the cell, and the cell range may be estimated to be much too short. In general, if an estimated cell range is larger than the stored cell range, the newly estimated cell range is probably more accurate. As consequence, at least the cell range should be changed in the database in such a case. Most likely, also the new cell coordinates are better than the previously stored ones, in case the estimate for the cell range is larger than before. Thus, also the cell coordinates should be changed.

The possibility of a refinement of the obtained cell coordinates and the cell ranges is of particular importance for areas in which there are may cells so that the cells are changed very frequently. A method that is based on one single visit in a cell will assume in this case that the cell is small. If the cell data is updated in a second short visit, the cell coordinates are simply set to a new position and the cell is again assumed to be small.

A possibility for an efficient update of the cell coordinates and the cell range will now be explained with reference to FIGS. 8a and 8b.

Figure 8:
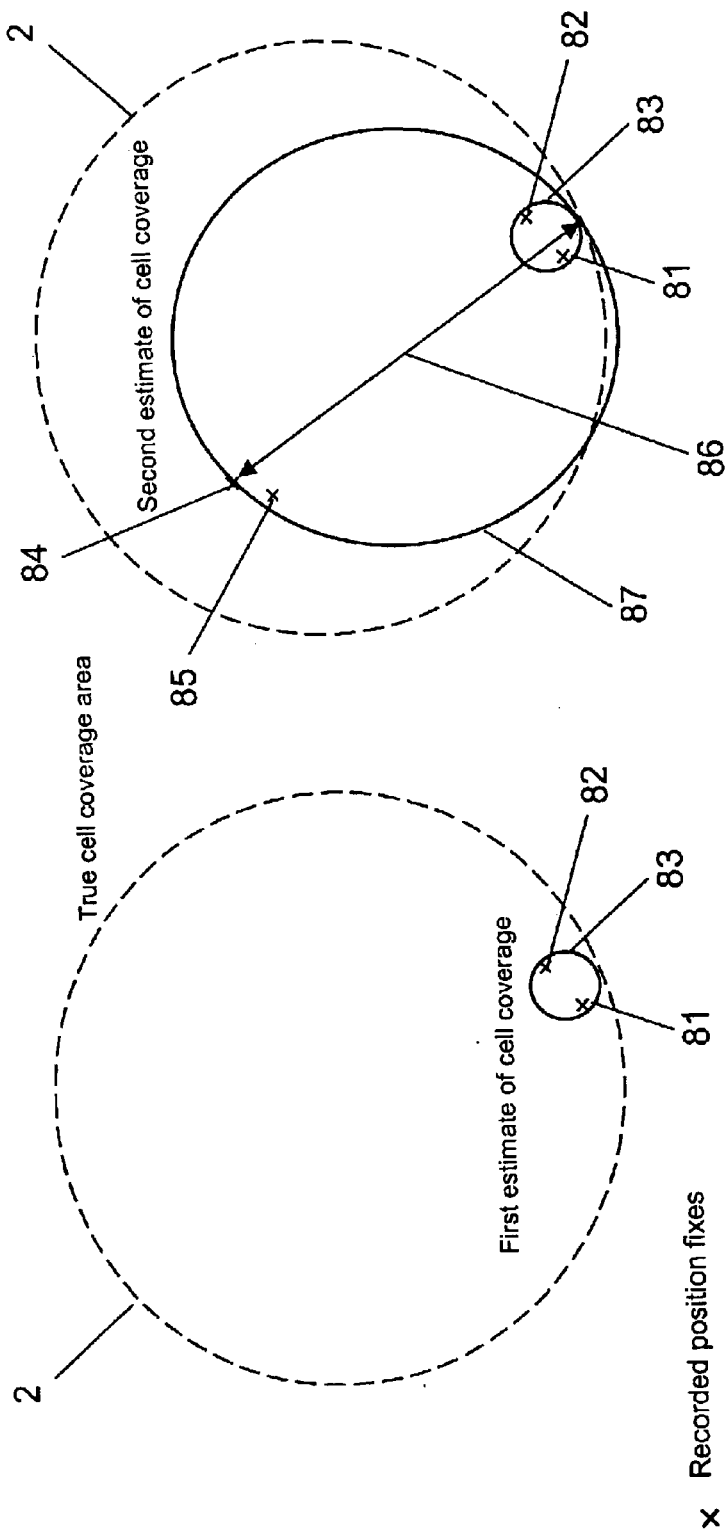
FIGS. 8a and b illustrate an update of stored geographical information.

FIG. 8a shows the boundaries of a cell 2 and two positions 81, 82 recorded during a first visit in the cell. In addition, a first estimate of the cell coverage is indicated as a circle 83. The center of the circle corresponds to the determined cell coordinates and the radius of the circle to the estimated cell radius. The cell coordinates and the cell radius are determined according to one of the methods described above.

FIG. 8b comprises as well the information of FIG. 8a and in addition information obtained during a second visit of the cell 2.

During this second visit in the cell, one or more new positions 84, 85 are recorded. In case at least one of these recorded positions 84, 85 lies outside of circle 83, the cell data is updated. To this end, first the newly recorded position 84 which is most distant from the center of the circle 83 is determined. A straight line 86 from this newly recorded position 84 to the center of the circle 83 is continued until it reaches the opposite edge of the circle 83. Now, the new cell coordinates are determined to correspond to the mean of the coordinates of the endpoints of this straight line 86, and the new cell radius is estimated to correspond to half of the length of this straight line 86. The resulting new estimate of the cell coverage is indicated with circle 87, which includes as well the old circle 83 as all of the newly recorded positions 84, 85. The new cell coordinates and the new cell range are stored in the database such that they replace the old cell coordinates and the old cell range stored for this cell 2.

The benefit of this approach for an update is that no extra storage is needed for enabling the update and that the cell coverage is likely to be well modeled after a couple of visits in the cell.

As mentioned above, the database associates CGIs to determined cell coordinates, given by latitude and longitude, and possibly also to an estimate of the cell range of the corresponding cell. The database should support the operations search, insert and delete. Search is best performed using the CGI, which is the key field of the data entries, i.e. it is unique to each entry. Further, some maximum number M of supportable CGIs should be set, since the data resides in the memory of the mobile terminal, which has its limits. Thus, there has to be a way to cope with the $M+1^{st}$ CGI. The natural choice is to remove one "unnecessary" CGI from the memory in order to clear space for a new CGI. The least necessary entry is probably the one that was least recently visited.

Now, two advantageous possibilities for creating and maintaining the database will be presented. Also this organization of the employed database is implemented in software.

Figure 9:
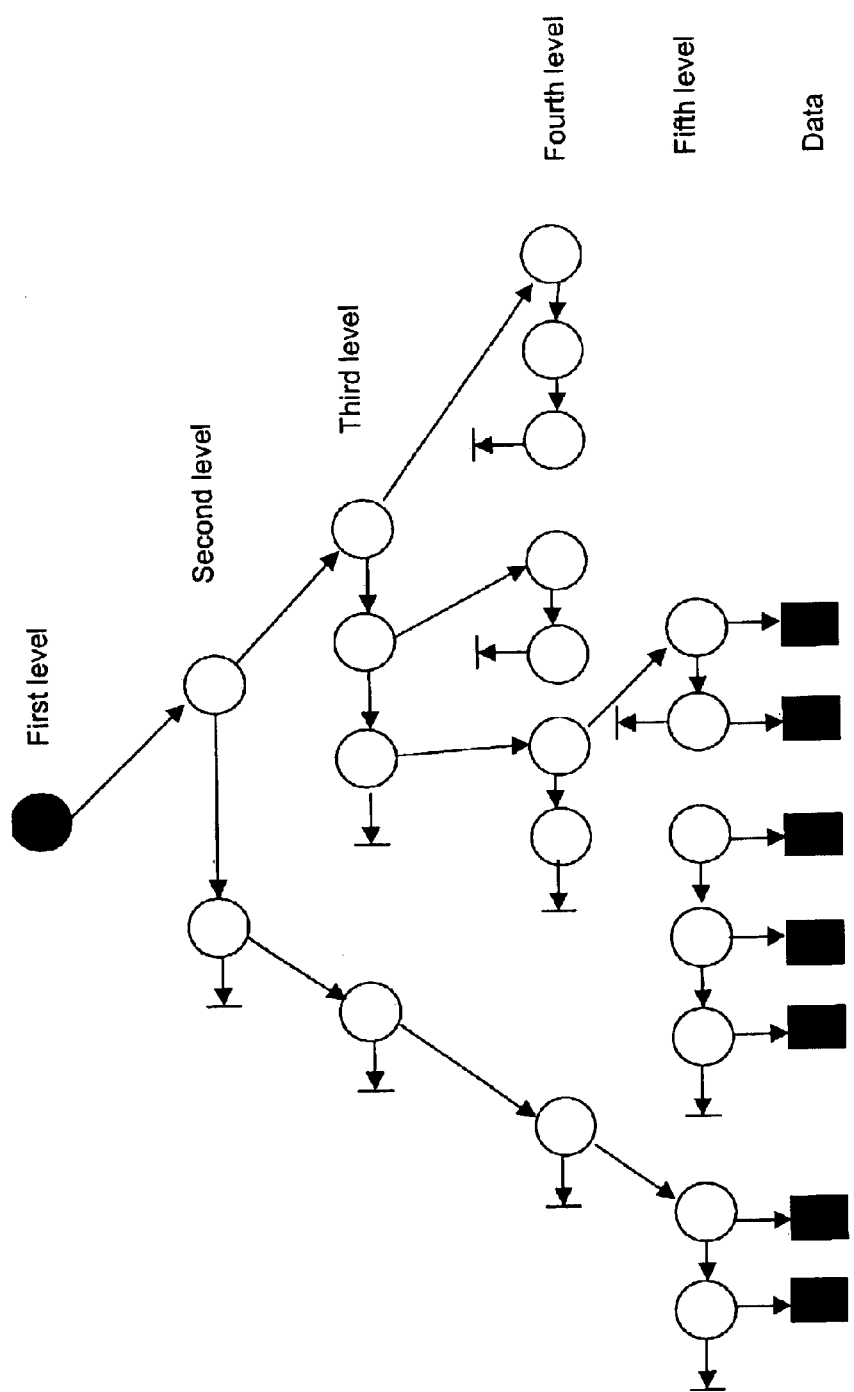
FIG. 9 is a graph employed for storing data generated according to one of the first to fifth embodiment of the method according to the invention.
Figure 10:
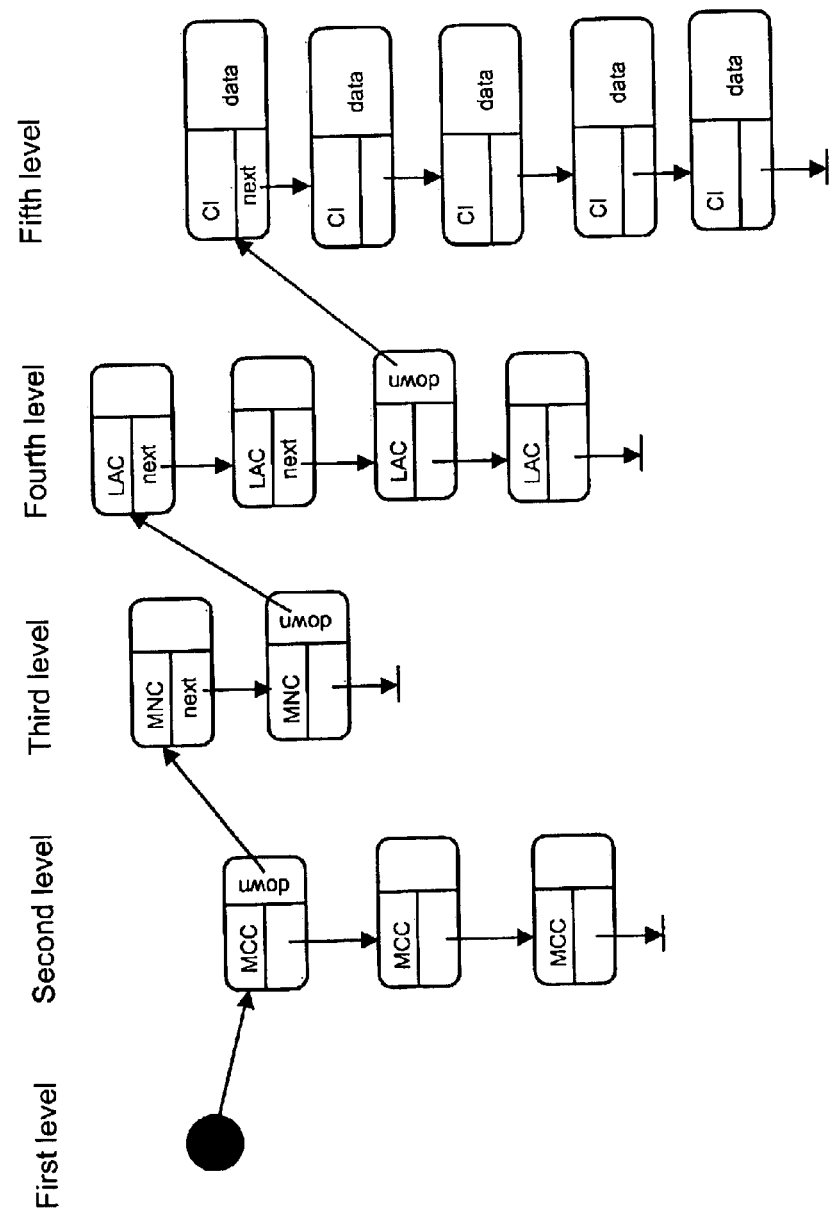
FIG. 10 shows details of the graph of FIG. 9.

The first possibility of organizing the database is illustrated in FIGS. 9 and 10.

FIG. 9 is a graph representing the general structure of the database.

The graph is divided to five different levels, arranged in the figure from top to bottom. Each level comprises nodes, which are represented by circles. The first level comprises only a single node serving as root. The root has a link to a first node of the second level. The nodes of the second level are organized in a line, each node having a link to the next node of the second level, and the last node of the second level is pointing to a null address or to a list end mark. Each node of the second level has a link to a similar line in the third level. Each node of the third level has a link to a similar line in the fourth level. Each node of the fourth level has a link to a similar line in the fifth level. From the nodes of the fifth level, there are no further links down to new nodes. Each node of the fifth level contains instead the actual data entries, which are indicated in FIG. 9 with rectangles. Every node of the graph reaches the data level, even though these connections are partly not shown in FIG. 9.

In a slightly different structure of the graph, the last node of each linked list could point to the upper level node. In this case, the graph would be cyclic.

The content of the graph is organized such that each level, except for the root, represents one part of the CGI.

FIG. 10 shows in more detail a selected path from the root of the graph of FIG. 9 to the data entries for a specific cell, in which the association of the components of the CGI to the different levels of the graph is illustrated. Here, levels one to five are arranged from left to right. The root is indicated again by a circle, while the other nodes of the graph are depicted as rounded rectangles.

The only function of the root in the first level is to provide the link to the second level.

As in FIG. 9, the root is connected to a first node of the list of the second level. Each node of the second level represents another country and comprise in a key field the corresponding MCCs. The first node of this line of the second level, which thus represents a specific country, is connected to the first node of a line of the third level. The nodes of the third level represent the mobile networks of the specific country and comprise in a key field the corresponding MNCs. The second node of the line of the third level, which corresponds to a specific mobile network, is connected to the first node of a line of the fourth level. The nodes of the fourth level represent different location areas served by the specific mobile network and comprise in a key field the corresponding LACs. The third node of the line of the fourth level, which corresponds to a specific location areas, is connected to the first node of a line of the fifth level. The nodes of the fifth level represent cells in the specific location areas and comprise in a key field the corresponding CIs.

The links between the different levels and within each line of one level are realized with pointers.

The nodes at the second, third and fourth levels have to this end in addition to the key field a next field and a down field. Each next field of a node comprises a pointer to the next node of the respective line, except for the last node of the line, which points to null. Each down field of a node comprises a pointer to the first node in the associated lower level line. The fields next and down are indicated in FIG. 10 for those nodes which form part of the selected path.

The fifth level nodes also comprise a corresponding next field, but instead of a down field they contain the data fields lat, lon and range. Data field lat comprises data on the latitude of the identified cell, data field Ion comprises data on the longitute of the identified cell, and data field range comprises data on the estimated range of the identified cell.

A new entry is always inserted to the beginning of the lines. For example, if geographical data for a cell having an MCC which is not yet represented in the graph is to be added, then a new MCC node is inserted between the root and the currently first MCC node. In this case, the corresponding new MNC, LAC and CI nodes are so far the only entries in their line, because the new MCC node starts a new branch in the structure. As another example, if geographical data for a cell is to be added which has in its CGI an MCC, an MNC and an LAC which are already represented in the graph, only a new CI node has to be inserted. This new CI node is inserted between the LAC node representing the LAC of the CGI of the cell and the currently first CI node of the line to which the LAC node is pointing.

The search operation is implemented such that when available geographical information is to be extracted from the database, each of the lines are gone through until the MCC, the MNC, the LAC and the CI matching the associated CGI are found. In the selected path of FIG. 10, this path leads from the root via the first MCC node, the first and second MNC nodes, the first, second and third LAC nodes and the first CI node to the second CI node, which comprises the desired data entries.

Each time when geographical information associated to a specific CGI is extracted from the database, e.g. as an initial position or for a rough positioning, the structure of the graph is reorganized. More specifically, the MCC, MNC, LAC and CI nodes which correspond to this CGI are moved to the beginning of their respective line. As a result, the search path to the most recently used data is the shortest. The advantage lies in the fact that at least in rough positioning applications, it is likely that a searched CGI has the same MCC, MNC and LAC as the previously searched CGI, so the data entries for a new cell will be found with a rather short path.

As a result of the reordering, the nodes that have not been used for a long time are moved towards the ends of their line. When the limiting number M of stored data is reached, it is therefore easy to find the data that is least used by going to the last CI node of the last LAC node of the last MNC node of the last MCC node. The memory occupied by this last CI node and the associated data can then be freed.

It is an advantage of the presented graph structure that it enables an easy search for CGIs. Especially those CGIs that have recently been used can be found easily and quickly. This is of particular advantage if the stored coordinates are to be used as initial position for a satellite based positioning. Once the coordinates for one cell are found, also the coordinates of the nearby known cells are found quickly if they are needed. This can be of particular advantage when the coordinates are required for an independent rough positioning.

The hierarchical architecture also enables storing the CGIs without redundantly storing the common MCCs, MNCs and LACs. A regular user spends most of the time only in one or two countries and is a customer of one network operator in each country. Thus, in the proposed structure, the MCC and MNC levels will usually consist of just a couple of nodes, and the corresponding information does not have to be repeated for each CGI associated to data in the graph. Thereby, a significant amount of memory space can be saved.

Figure 11:
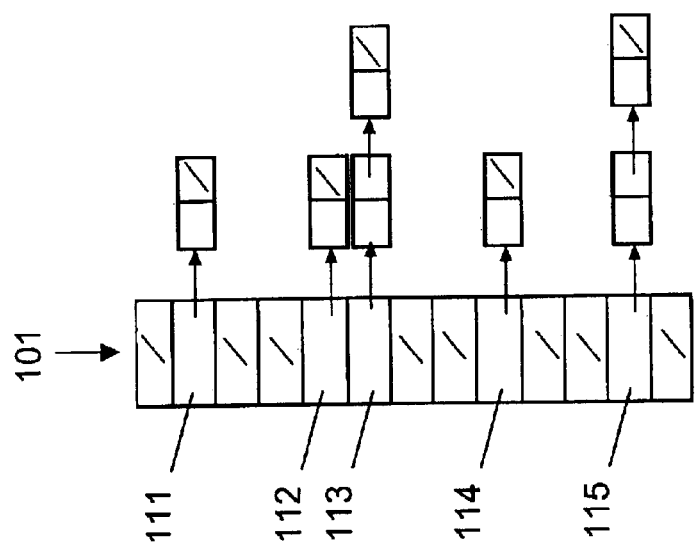
FIG. 11 represents a hash table employed for storing data generated according to one of the first to fifth embodiment of the method according to the invention.

The second possibility of organizing the database is illustrated in FIG. 11. FIG. 11 represents a hash table which is to be used as alternative data structure.

In its basic form, a hash table is a fixed length array. Such an array 101 is depicted on the left hand side of FIG. 11. The array 101 comprises a plurality of slots, and in each slot a CGI and data associated to this CGI can be stored, i.e. the cell coordinates and possibly the cell range.

A hash table is generally used in dictionary-kind of applications, where a quick search is required. The entries are stored in the hash table according to the value of a hash function h(k). The hash function h(k) will always result in the same value when it is applied to the same key k. Here, the CGI is used as key k. The value of the hash function h(k) is an integer number which indicates an index of the table. The index identifies the slot where a specific CGI can be inserted or found, so the search for the correct slot may require only a single step. For example, if the array comprises slots with indices 1 to 500 and the value of the hash function for a specific CGI is h(k)=311, then the slot with index 311 is selected to find a desired entry, to insert a new entry or to delete a stored entry.

Depending on the kind of hash function and on the length of the array 101 of the hash table, however, the hash function does not necessarily result in different values for all possible CGIs. Thus, the same slot of the hash table may be associated to several CGIs.

This kind of collision can be overcome by chaining. Each slot of the array 101 of the hash table contains a pointer which may point to a linked list of further slots. Such linked lists are shown in FIG. 11 for the slots with reference numbers 111, 112, 113, 114 and 115. Slots 111, 112 and 114 form part of a list with one additional slot, while slots 113 and 115 form part of a list with two additional slots. The other slots in the array 101 are not linked to additional slots. The respective last slot in each list is marked by a slash in FIG. 11. The lists are generated, extended and reduced as required. A first CGI resulting in a specific slot index is stored in the corresponding slot of the array 101. Each further CGI resulting in the same specific slot index is stored in a slot of the linked list connected to the corresponding slot of the array 101. As a result, the search for a particular CGI has to go in maximum through the whole list associated with the hash table slot with the index h(k) which was determined for the particular CGI. If the hash function is well chosen, the chains do not become long and the entries are scattered rather uniformly in the table.

Alternatively, the linked lists and the dynamical memory allocation can be avoided by providing several hash functions. In case of a collision, new hash functions are applied in a systematic way, and the resulting new hash function values are tried until a free slot is found. This slows down the search a little, but not much more than the linked list implementation.

There is a trade-off between search time and memory consumption. The larger the table, the less likely are collisions and the shorter are the chains. However, a large table contains also more empty slots than a compact one.

For supporting a deletion of entries from the hash table, a frequency counter can be associated with each contained CGI. The entries with the smallest counter values can then be deleted first, since they correspond to cells which are least visited by the mobile terminal.

It is an advantage of the hash table that it enables a very efficient search and a rather efficient memory consumption. The simple structure further leads to an easy implementation.

While there have shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for generating entries for a database, which database is destined for supporting a positioning of a mobile terminal, said method comprising:

calculating at least one position of a mobile terminal in a cell of a cellular network;

determining geographical information on said cell based on said at least one calculated position of said mobile terminal in said cell; and providing said determined geographical information together with an identification of said cell for storage in said database.

2. The method according to claim 1, wherein said cellular network provides a notification to said mobile terminal when said mobile terminal enters a new cell of said cellular network together with said identification of said cell.

3. The method according to claim 1, wherein a position of said mobile terminal is calculated when said mobile terminal enters said cell, and wherein said geographical information on said cell is determined to correspond to the coordinates of said calculated position.

4. The method according to claim 1, wherein a first position of said mobile terminal is calculated when said mobile terminal enters said cell, wherein a second position of said mobile terminal is calculated when said mobile terminal exits said cell, and wherein said geographical information on said cell is determined to correspond to the mean of the coordinates of said first position and said second position.

5. The method according to claim 1, wherein positions of said mobile terminal within said cell are calculated at different points of time, and wherein said geographical information on said cell is determined based on a statistical evaluation of a plurality of calculated positions of said mobile terminal within said cell.

6. The method according to claim 1, wherein positions of said mobile terminal within said cell are calculated at different points of time, and wherein said geographical information on said cell is determined to correspond to the mean of the coordinates of those two calculated positions which are most distant to each other among a plurality of calculated positions of said mobile terminal within said cell.

7. The method according to claim 1, wherein said cell is currently a serving cell for said mobile terminal, wherein positions of said mobile terminal within said cell are calculated at different points of time, wherein at a plurality of calculated positions of said mobile terminal within said cell a dedicated value of a timing advance parameter is received by said mobile terminal from a base transceiver station of said cellular network serving said cell, and wherein said geographical information on said cell is determined to correspond to the coordinates of a position at which the smallest value of said timing advance parameter is received.

8. The method according to claim 1, further comprising estimating a cell range for said cell and providing said estimated cell range together with said geographical information and said identification of said cell for storage in said database.

9. The method according to claim 8, wherein a first position of said mobile terminal is calculated when said mobile terminal enters said cell, wherein a second position of said mobile terminal is calculated when said mobile terminal exits said cell, and wherein said cell range is estimated to correspond to half of the distance between said first position and said second position.

10. The method according to claim 8, wherein positions of said mobile terminal within said cell are calculated at different points of time, and wherein said cell range is estimated to correspond to half of the distance between those two calculated positions which are most distant to each other among a plurality of calculated positions of said mobile terminal within said cell.

11. The method according to claim 8, wherein said cell is currently a serving cell for said mobile terminal, wherein at a plurality of positions of said mobile terminal within said cell a dedicated value of a timing advance parameter is received by said mobile terminal from a base transceiver station of said cellular network serving said cell, and wherein said cell range is estimated based on the length of a propagation path of signals transmitted from said base transceiver station to said mobile station at a position associated to the largest value of said timing advance parameter, which length of propagation path is indicated by said largest value of said timing advance parameter.

12. The method according to claim 1, wherein said at least one position of a mobile terminal in a cell of a cellular network is calculated based on satellite signals.

13. The method according to claim 1, further comprising storing said provided geographical information together with said provided identification of said cell as well as cell range information, if provided, in said database.

14. The method according to claim 13, further comprising updating said database when new information on a specific cell is provided when said mobile terminal reenters said cell.

15. The method according to claim 14, wherein said database information includes an estimate of the cell coordinates and an estimate of the cell radius, wherein at least one position of said mobile terminal in said cell is calculated when said mobile terminal reenters said cell, and wherein said updating comprises
    determining a circular area of which the center is given by said estimated cell coordinates and of which the radius is given by said estimated cell radius;
    determining whether at least one of said at least one position calculated after said mobile terminal reentered said cell lies outside of said determined circular area;
    connecting a calculated position which is determined to lie outside of said determined circular area with the center of said circular area by a straight line and extending said straight line to the border of said circular area;
    determining new cell coordinates to correspond to the mean of the coordinates of the endpoints of said straight line; and
    estimating a new cell radius to correspond to one half of the length of said straight line.

16. The method according to claim 15, wherein a plurality of positions of said mobile terminal in said cell is calculated when said mobile terminal reenters said cell, and wherein said updating comprises determining which one of all calculated positions which are determined to lie outside of said determined circular area is most distant to said center of said circular area, and employing said most distant calculated position as starting point for said straight line.

17. The method according to claim 13, wherein said identification of a cell is composed of values of hierarchical components, wherein said database has a hierarchical structure which comprises a dedicated level for each hierarchical component of said identification, each level comprising nodes representing a different value of a specific hierarchical component, wherein nodes of the highest level of said hierarchical structure are connected in a chained line, a first node of said highest level nodes being accessible via a root node, wherein each node of a specific level except for the lowest level points to a chained line of nodes in the respective subordinate level, and wherein each node of the lowest level comprises data with geographical information.

18. The method according to claim 17, wherein provided geographical information on a new cell is inserted into said database such that a respective node representing a value of a hierarchical component identifying said cell which is not yet comprised in said hierarchical structure is inserted at the beginning of the respective line of nodes.

19. The method according to claim 17, wherein in case geographical information for a specific cell is extracted from said database, those nodes representing the values of the hierarchical components of the identification of said cell are shifted to the first place in their respective line.

20. The method according to claim 13, wherein said database comprises a hash table for storing geographical information for a plurality of cells, the slot in said table for storing said geographical information for a specific cell being determined by a hash function applied to an identification of said specific cell.

21. The method according to claim 20, wherein in case a slot of said hash table determined for storing geographical information on a specific cell is already used for storing geographical information on another cell, a pointer associated to said determined slot is used for pointing to a list of additional slots in one of which said geographical information on said specific cell is stored.

22. A unit comprising processing means for determining geographical information on a cell of a cellular network based on at least one calculated position of a mobile terminal in said cell and for providing said determined geographical information together with an identification of said cell for storage in a database which database is destined for supporting a positioning of a mobile terminal.

23. The unit according to claim 22, further comprising receiving means for receiving a notification transmitted from said cellular network to said mobile terminal when said mobile terminal enters a new cell of said cellular network together with an identification of said cell.

24. The unit according to claim 22, wherein said processing means determine said geographical information on said cell to correspond to the coordinates of a calculated position of said mobile terminal within said cell, which calculated position was calculated when said mobile terminal entered said cell.

25. The unit according to claim 22, wherein said processing means determine said geographical information on said cell to correspond to the mean of the coordinates of a first position and a second position of said mobile terminal, which first position was calculated when said mobile terminal entered said cell, and which second position was calculated when said mobile terminal exited said cell.

26. The unit according to claim 22, wherein said processing means determine said geographical information on a cell based on a statistical evaluation of a plurality of calculated positions of said mobile terminal within said cell, which plurality of calculated positions was calculated at different points of time.

27. The unit according to claim 22, wherein said processing means determine said geographical information on said cell to correspond to the mean of the coordinates of those two calculated positions which are most distant to each other among a plurality of calculated positions of said mobile terminal within said cell, which plurality of calculated positions was calculated at different points of time.

28. The unit according to claim 22, wherein said processing means receive a dedicated value of a timing advance parameter originating from a base transceiver station of said cellular network serving said cell, which cell is currently a serving cell for said mobile terminal, for a plurality of calculated positions, which plurality of calculated positions was calculated at different points of time, and wherein said processing means determine said geographical information on said cell to correspond to the coordinates of a position for which the smallest value of said timing advance parameter is received.

29. The unit according to claim 22, wherein said processing means further estimate a cell range for said cell and provide said estimated cell range together with said geographical information and said identification of said cell for storage in said database.

30. The unit according to claim 29, wherein said processing means estimate said cell range to correspond to half of the distance between a first position and a second position of said mobile terminal, which first position was calculated when said mobile terminal entered said cell, and which second position was calculated when said mobile terminal exited said cell.

31. The unit according to claim 29, wherein said processing means estimate said cell range to correspond to half of the distance between those two calculated positions which are most distant to each other among a plurality of calculated positions of said mobile terminal within said cell, which plurality of calculated positions was calculated at different points of time.

32. The unit according to claim 29, wherein said processing means receive a dedicated value of a timing advance parameter originating from a base transceiver station of said cellular network serving said cell, which cell is currently a serving cell for said mobile terminal, for a plurality of positions of said mobile terminal in said cell, and wherein said processing means estimate said cell range based on the length of a propagation path of signals transmitted from said base transceiver station to said mobile station at a position associated to the largest value of said timing advance parameter, which length of propagation path is indicated by said largest value of said timing advance parameter.

33. The unit according to claim 22, further comprising processing means for calculating said at least one position of said mobile terminal.

34. The unit according to claim 22, further comprising processing means for calculating said at least one position of said mobile terminal based on satellite signals.

35. The unit according to claim 22, further comprising a database for storing said provided geographical information together with said provided identification of said cell as well as cell range information, if provided.

36. The unit according to claim 35, wherein said processing means update said database when new information on a specific cell is provided when said mobile terminal reenters said cell.

37. The unit according to claim 36, wherein said processing means provide an estimate of the cell coordinates and an estimate of the cell radius together with an identification of said cell for storage in said database, and wherein said processing means
  determine a circular area of which the center is given by said estimated cell coordinates and of which the radius is given by said estimated cell radius;
  determine whether at least one position of said mobile terminal in said cell which was calculated after said mobile terminal reentered said cell lies outside of said determined circular area;
  connect a calculated position which is determined to lie outside of said determined circular area with the center of said circular area by a straight line and extend said straight line to the border of said circular area;
  determine new cell coordinates to correspond to the mean of the coordinates of the endpoints of said straight line; and
  estimate a new cell radius to correspond to one half of the length of said straight line.

38. The unit according to claim 36, wherein said processing means determine which one of a plurality of positions which were calculated when said mobile terminal reentered said cell and which are determined to lie outside of said determined circular area is most distant to said center of said circular area, and employ said most distant calculated position as starting point for said straight line.

39. The unit according to claim 35, wherein said identification of a cell is composed of values of hierarchical components, wherein said database has a hierarchical structure which comprises a dedicated level for each hierarchical component of said identification, each level comprising nodes representing a different value of a specific hierarchical component, wherein nodes of the highest level of said hierarchical structure are connected in a chained line, a first node of said highest level nodes being accessible via a root node, wherein each node of a specific level except for the lowest level points to a chained line of nodes in the respective subordinate level, and wherein each node of the lowest level comprises data with geographical information.

40. The unit according to claim 39, wherein said processing means insert provided geographical information on a new cell into said database such that a respective node representing a value of a hierarchical component identifying said cell which is not yet comprised in said hierarchical structure is inserted at the beginning of the respective line of nodes.

41. The unit according to claim 39, wherein in case said processing means extract geographical information for a specific cell from said database, said processing means shift those nodes representing the values of the hierarchical components of the identification of said cell to the first place in their respective line.

42. The unit according to claim 35, wherein said database comprises a hash table for storing geographical information for a plurality of cells, and wherein said processing means determine the slot in said table for storing said geographical information for a specific cell by applying a hash function to an identification of said specific cell.

43. The unit according to claim 42, wherein in case said processing means determine a slot of said hash table for storing geographical information on a specific cell which is already used for storing geographical information on another cell, said processing means store said geographical information on said specific cell in a slot of a list of additional slots to which a pointer associated to said determined slot is pointing.

44. The unit according to claim 22, wherein said unit is a mobile terminal comprising means for accessing a cellular network.

45. The unit according to claim 44, wherein said at least one position of said mobile terminal is calculated based on satellite signals, and wherein said mobile terminal further comprises a receiver of a satellite positioning system for receiving said satellite signals.

46. The unit according to claim 22, wherein said unit is a network unit which is accessible for mobile terminals.

47. A positioning system comprising a mobile terminal with communication means for communicating with a cellular network, a database destined for supporting a positioning of said mobile terminal, processing means for calculating at least one position of said mobile terminal in a cell of said cellular network and processing means for determining geographical information on said cell based on said at least one calculated position of said mobile terminal in said cell and for providing said determined geographical information together with an identification of said cell for storage in said database.

48. The positioning system according to claim 47, wherein said communication means of said mobile terminal comprising receiving means for receiving a notification transmitted from said cellular network to said mobile terminal when said mobile terminal enters a new cell of said cellular network together with an identification of said cell.

49. The positioning system according to claim 47, wherein said processing means for calculating at least one position calculate a position of said mobile terminal when said mobile terminal enters a cell, and wherein said processing means for determining geographical information determine said geographical information to correspond to the coordinates of said calculated position.

50. The positioning system according to claim 47, wherein said processing means for calculating at least one position in said cell calculate a first position of said mobile terminal when said mobile terminal enters said cell, wherein said processing means for calculating at least one position calculate a second position of said mobile terminal when said mobile terminal exits said cell, and wherein said processing means for determining geographical information determine said geographical information on said cell to correspond to the mean of the coordinates of said first position and said second position.

51. The positioning system according to claim 47, wherein said processing means for calculating at least one position calculate positions of said mobile terminal within said cell at different points of time, and wherein said processing means for determining geographical information determine said geographical information on a cell based on a statistical evaluation of a plurality of calculated positions of said mobile terminal within said cell.

52. The positioning system according to claim 47, wherein said processing means for calculating at least one position calculate positions of said mobile terminal within said cell at different points of time, and wherein said processing means for determining geographical information determine said geographical information on said cell to correspond to the mean of the coordinates of those two calculated positions which are most distant to each other among a plurality of calculated positions of said mobile terminal within said cell.

53. The positioning system according to claim 47, wherein said processing means for calculating at least one position calculate positions of said mobile terminal within said cell, which cell is currently a serving cell for said mobile terminal, at different points of time, wherein said processing means for determining geographical information receive a dedicated value of a timing advance parameter originating from a base transceiver station of said cellular network serving said cell for a plurality of said calculated positions, and wherein said processing means for determining geographical information determine said geographical information on said cell to correspond to the coordinates of a position for which the smallest value of said timing advance parameter is received.

54. The positioning system according to claim 47, wherein said processing means for determining geographical information further estimate a cell range for said cell and provide said estimated cell range together with said geographical information and said identification of said cell for storage in said database.

55. The positioning system according to claim 54, wherein said processing means for calculating at least one position calculate a first position of said mobile terminal when said mobile terminal enters said cell, wherein said processing means for calculating at least one position calculate a second position of said mobile terminal when said mobile terminal exits said cell, and wherein said processing means for determining geographical information estimate said cell range to correspond to half of the distance between said first position and said second position.

56. The positioning system according to claim 54, wherein said processing means for calculating at least one position calculate positions of said mobile terminal within said cell at different points of time, and wherein said processing means for determining geographical information estimate said cell range to correspond to half of the distance between those two calculated positions which are most distant to each other among a plurality of calculated positions of said mobile terminal within said cell.

57. The positioning system according to claim 54, wherein said processing means receive a dedicated value of a timing advance parameter originating from a base transceiver station of said cellular network serving said cell, which cell is currently a serving cell for said mobile terminal, for a plurality of positions of said mobile terminal in said cell, and wherein said processing means for determining geographical information estimate said cell range based on the length of a propagation path of signals transmitted from said base transceiver station to said mobile station at a position associated to the largest value of said timing advance parameter, which length of propagation path is indicated by said largest value of said timing advance parameter.

58. The positioning system according to claim 47, further comprising a receiver for receiving satellite signals, wherein said processing means calculate said at least one position of said mobile terminal in a cell of said cellular network based on satellite signals received by said receiver.

59. The positioning system according to claim 47, comprising processing means for updating said database when new information on a specific cell is provided by said processing means for determining geographical information when said mobile terminal reenters said cell.

60. The positioning system according to claim 59, wherein said processing means for calculating at least one position of said mobile terminal calculate at least one position of said mobile terminal when said mobile terminal reenters said cell, wherein said processing means for determining geographical information on said cell provide an estimate of the cell coordinates and an estimate of the cell radius together with an identification of said cell for storage in said database, and wherein said processing means for determining geographical information on said cell
    determine a circular area of which the center is given by said estimated cell coordinates and of which the radius is given by said estimated cell radius;
    determine whether at least one position of said mobile terminal in said cell which was calculated after said mobile terminal reentered said cell lies outside of said determined circular area;

connect a calculated position which is determined to lie outside of said determined circular area with the center of said circular area by a straight line and extend said straight line to the border of said circular area;

determine new cell coordinates to correspond to the mean of the coordinates of the endpoints of said straight line; and estimate a new cell radius to correspond to one half of the length of said straight line.

61. The positioning system according to claim 60, wherein said processing means for calculating at least one position of said mobile terminal calculate a plurality of positions of said mobile terminal when said mobile terminal reenters said cell, and wherein said processing means for determining geographical information on said cell determine which one of a plurality of positions which were calculated when said mobile terminal reentered said cell and which are determined to lie outside of said determined circular area is most distant to said center of said circular area and employ said most distant calculated position as starting point for said straight line.

62. The positioning system according to claim 47, wherein said identification of a cell is composed of values of hierarchical components, wherein said database has a hierarchical structure which comprises a dedicated level for each hierarchical component of said identification, each level comprising nodes representing a different value of a specific hierarchical component, wherein nodes of the highest level of said hierarchical structure are connected in a chained line, a first node of said highest level nodes being accessible via a root node, wherein each node of a specific level except for the lowest level points to a chained line of nodes in the respective subordinate level, and wherein each node of the lowest level comprises data with geographical information.

63. The positioning system according to claim 62, comprising processing means for inserting provided geographical information on a new cell into said database such that a respective node representing a value of a hierarchical component identifying said cell which is not yet comprised in said hierarchical structure is inserted at the beginning of the respective line of nodes.

64. The positioning system according to claim 62, comprising processing means for extracting data from said database, wherein in case said processing means extract geographical information for a specific cell from said database, said processing means shift those nodes representing the values of the hierarchical components of the identification of said cell to the first place in their respective line.

65. The positioning system according to claim 47, wherein said database comprises a hash table for storing geographical information for a plurality of cells, said positioning system comprising processing means for determining a slot in said table for storing said geographical information for a specific cell by applying a hash function to an identification of said specific cell.

66. The positioning system according to claim 65, wherein in case said processing means for determining a slot determine a slot of said hash table for storing geographical information on a specific cell which is already used for storing geographical information on another cell, said processing means store said geographical information on said specific cell in a slot of a list of additional slots to which a pointer associated to said determined slot is pointing.

67. The positioning system according to claim 47, wherein said mobile terminal comprises said processing means for determining geographical information.

68. The positioning system according to claim 58, wherein said mobile terminal comprises said receiver.

69. The positioning system according to claim 58, wherein said mobile terminal is connected to said receiver.

70. The positioning system according to claim 47, wherein said mobile terminal comprises said database.

71. The positioning system according to claim 58, wherein said receiver comprises said processing means for calculating at least one position of said mobile terminal in a cell.

72. The positioning system according to claim 47, comprising a network unit accessible by a mobile terminal, which network unit includes said processing means for determining geographical information.

73. The positioning system according to claim 47, comprising a network unit accessible by a mobile terminal, which network unit includes said processing means for calculating at least one position of a mobile terminal.

74. The positioning system according to claim 47, comprising a network unit accessible by a mobile terminal, which network unit includes said database.

* * * * *